Dec. 15, 1931.  A. W. F. CAPPS  1,836,525

DRYING BY AIR CIRCULATION

Filed Dec. 20, 1928

INVENTOR
A.W.F. CAPPS
BY
ATTORNEY

Patented Dec. 15, 1931

1,836,525

UNITED STATES PATENT OFFICE

ARTHUR WILLIAM FRANCIS CAPPS, OF GAYWOOD, KINGS LYNN, ENGLAND

DRYING BY AIR CIRCULATION

Application filed December 20, 1928, Serial No. 327,350, and in Great Britain January 5, 1928.

This invention relates to drying by air circulation, and has for its object to provide an improved process and apparatus in which material may be dried in a manner which is thermally more efficient than heretofore.

A further object of the invention, which is particularly applicable for drying vegetable crops such as sugar beet, grass and other solid materials but is also intended for use in drying or concentrating liquids such as sugar solutions, is to provide an improved process and apparatus in which the air or other drying medium (hereinafter referred to as air) is passed in one direction through a heat exchanger forming a wall of the drying compartment, this exchanger being heated by the passage in the opposite direction of the air which has previously passed over the material to be dried.

With this and other objects in view, the invention consists in the improved processes and apparatus hereinafter described the novel features of which are set out in the appended claiming clauses.

It is to be understood that wherever I speak of "air passing over the material to be dried", I mean "moving relatively thereto", and this expression is to be regarded as covering also passing under, through, or alongside.

In the improved apparatus, the air has its temperature raised progressively as it passes over the material, and the material is preferably moved through the apparatus in a direction opposite to that of the incoming air so that the air first acts on material which is already practically dry, and the greater part of the drying is effected at a relatively high temperature. The return passage of the heat exchanger acts as a condenser which enables the latent heat of the vapours to be recovered and returned to the incoming air through the heat exchanger.

Figure 1:
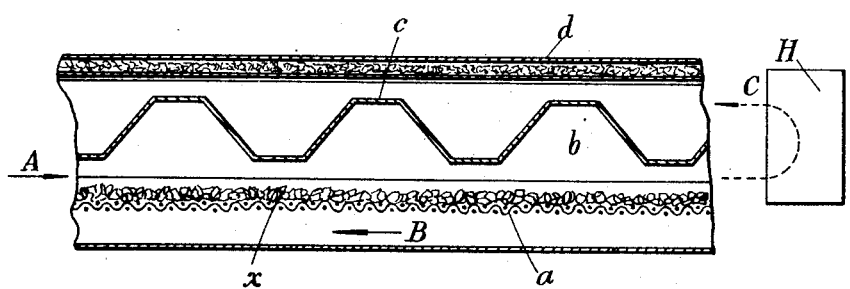
Figure 2:
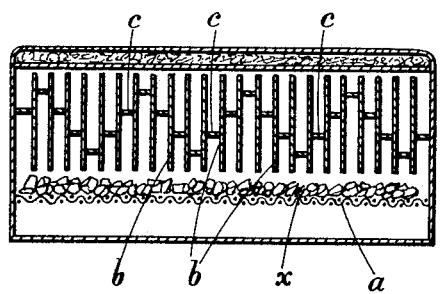

Referring to the accompanying drawings which illustrate the invention,

Fig. 1 represents in diagrammatic manner a longitudinal section of a portion of one form of a drying apparatus in accordance with the invention, Fig. 2 represents a transverse section through the apparatus shown in Fig. 1.

The material $x$ to be dried such as sugar beet cossets are carried upon a conveyor $a$ preferably of reticulated form which moves slowly in the direction of the arrow B.

The drying air passes in the direction of the arrow A over the material and between plates $b$ forming the heat exchanger and returns between the plates on the other side of the heat exchanger walls $c$.

The heat exchanger in this form takes the form of plates $b$ arranged close together to give the necessary surface area, and the walls separating the two sides of the exchanger are provided by strips $c$ which are preferably of undulating form so as to deflect the heated air back on to the material being dried and are preferably successively varied in phase as indicated by the cross-section of Fig. 2.

Dry air enters at the end at which the dried material passes out and becomes heated by the heat exchanger walls so that its temperature rises as it passes over the wet material, the amount of moisture which it can absorb for saturation increasing with its rise in temperature. Between its exit from the end of the drying space and its return through the condenser space as indicated by the arrow C, the hot saturated air is raised in temperature by passage through a heater H for instance by passing it through a furnace or by means of tubes through the flue gases of a steam engine operating the conveyor and air fan or the like.

The upper surface of the condenser is preferably provided with a heat-insulating wall $d$.

From the above it will be apparent that the drying system here described is to be clearly distinguished from systems employing a recirculation of the drying air to reduce heat losses, for the present system is based upon the regenerative feature, that is the recovery of the latent heat from the vapors driven off from the material being dried and employing this to do considerably more than half the drying. The thermal saving of the present invention is essentially procured through a continual condensation of the vapor in the drying medium, that is in such medium coming from the wet material end of the drying channel, during the return passage of such drying medium lengthwise the duct on the opposite side of the heat exchange partition. A material saving in heat exchange surface is obtained by imposing on the drying side of the vapor flow a maximum number of alternate reheatings by contact with the exchange surface, and passages through the material being dried; thus maintaining the temperature difference as great as possible at all corresponding points between the drying and condensing compartments and thus a maximum heat transfer through the heat exchanger. Pure economy is obtained by fanning dry air in at the material delivery end of the drying channel instead of recirculating by a plurality of fans situated at intervals along the drying compartment.

I claim:—

1. A drying apparatus comprising a long chamber through which is passed a current of heated air, a reticulated conveyor for the material to be dried moving within said chamber in the opposite direction to said current of heated air, a long return chamber for said air, means for heating the air between passages along said chambers, and a heat exchanging partition between said chambers, said heat exchanging partition being subjected to the latent heat recovered by condensation of the moisture in said air current and previously extracted from the material to be dried.

2. A drying apparatus comprising a long chamber through which is passed a current of heated air, a conveyor for the material to be dried moving within said chamber in opposite direction to said current of heated air, a return chamber for said air, means for heating the air between passages along said chambers, and a heat-exchanging partition of sinuous form between said chambers, said heat-exchanging partition being subjected to the latent heat recovered by condensation of the moisture in said air current and previously extracted from the material to be dried.

In testimony whereof I affix my signature.

ARTHUR WILLIAM FRANCIS CAPPS.